(12) United States Patent
Tate

(10) Patent No.: US 12,388,659 B2
(45) Date of Patent: *Aug. 12, 2025

(54) NETWORK SYSTEM, DEVICE, AND PROCESSING METHOD

(71) Applicant: CONNECTFREE CORPORATION, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,367

(22) Filed: May 17, 2024

(65) Prior Publication Data

US 2024/0305475 A1    Sep. 12, 2024

Related U.S. Application Data

(63) Continuation of application No. 17/604,716, filed as application No. PCT/JP2020/016576 on Apr. 15, 2020, now Pat. No. 12,022,008.

(30) Foreign Application Priority Data

Apr. 19, 2019 (JP) ................ 2019-080299

(51) Int. Cl.
*H04L 9/40*    (2022.01)
*H04L 9/32*    (2006.01)

(52) U.S. Cl.
CPC ........ *H04L 9/3263* (2013.01); *H04L 63/0823* (2013.01)

(58) Field of Classification Search
CPC ................ H04L 9/3263; H04L 63/0823
(Continued)

(56) References Cited

U.S. PATENT DOCUMENTS 7,610,487 B2    10/2009 Aura
9,332,002 B1 *    5/2016 Bowen ............... H04L 63/0823
(Continued)

FOREIGN PATENT DOCUMENTS

CN    101291216 A    10/2008
JP    2005110269 A    4/2005
(Continued)

OTHER PUBLICATIONS

Tiffany Hyun-Jin Kim, et al., GeoPKI: Converting Spatial Trust into Certificate Trust, Carnegie Mellon University, Sep. 2012, 18 pgs.
(Continued)

*Primary Examiner* — Michael S McNally
(74) *Attorney, Agent, or Firm* — Merchant & Gould P.C.

(57) ABSTRACT

A network system including a plurality of devices can acquire authenticated location information of a device and provides various services using the authenticated location information. Each of the plurality of devices includes: a communication unit for performing data communication with another device; a storage unit that stores a digital certificate including a public key for determining an IP address of the device; and a determination unit that determines an IP address of another device based on a public key included in a digital certificate received from the another device. The digital certificate includes location information associated with a corresponding device.

19 Claims, 17 Drawing Sheets

(58) Field of Classification Search
USPC .......................................................... 726/10
See application file for complete search history.

(56) References Cited

U.S. PATENT DOCUMENTS

| | | | | |
|---|---|---|---|---|
| 2002/0152384 A1* | 10/2002 | Shelest | ................. | H04L 9/3247 |
| | | | | 713/176 |
| 2005/0071627 A1 | 3/2005 | Montenegro | | |
| 2006/0047960 A1 | 3/2006 | Ono | | |
| 2006/0095388 A1 | 5/2006 | Brown | | |
| 2007/0061574 A1* | 3/2007 | Shelest | ................. | H04L 9/3247 |
| | | | | 713/170 |
| 2007/0088834 A1* | 4/2007 | Litovski | .............. | H04L 63/0272 |
| | | | | 709/227 |
| 2007/0198835 A1 | 8/2007 | Mudhar | | |
| 2012/0110326 A1 | 5/2012 | Rossi | | |
| 2018/0041487 A1 | 2/2018 | Wang | | |
| 2018/0158058 A1 | 6/2018 | Kogure | | |
| 2020/0267553 A1* | 8/2020 | Wagner | ................... | G06F 21/32 |

FOREIGN PATENT DOCUMENTS

| | | |
|---|---|---|
| JP | 2012504285 A | 2/2012 |
| JP | 2015-170305 A | 9/2015 |
| JP | 2015170303 A | 9/2015 |
| JP | 2017103614 A | 6/2017 |
| JP | 2017108466 A | 6/2017 |
| JP | 2018-093434 A | 6/2018 |
| TW | 200629846 A | 8/2006 |
| WO | 2005008954 A1 | 1/2005 |
| WO | 2010036887 A1 | 4/2010 |

OTHER PUBLICATIONS

Taiwan Office Action received for TW Application No. 11321103220 on Oct. 29, 2024, 6 pgs.
Japanese Office Action received for JP Application No. 2024-039538 on Dec. 17, 2024, 6 pgs.
Masao Oishi et al., "Prototype implementation and evaluation of DHCP enhancement method to prevent IP address spoofing attacks using released address", with English Abstract 723-728 (2013).

* cited by examiner

FIG.5

| AAA | AAB | ABA | ABB |   |
|-----|-----|-----|-----|---|
| AAC | AAD | ABC | ABD | B |
| ACA | ACB | AD  |     |   |
| ACC | ACD |     |     |   |

|   | DA | DBA | DBB |
|   |    | DBC | DBD |
| C | DC | DDA | DDB |
|   |    | DDC | DDD |

10SRV

| Room | RESOURCE (TIME) | | | |
|---|---|---|---|---|
| 1001 | | Customer1 IP ADDRESS xx | | |
| 1002 | | | | |
| 1003 | | Customer2 IP ADDRESS yy | | |
| 1004 | | | Customer3 IP ADDRESS zz | |
| ⋮ | ⋮ | | | |

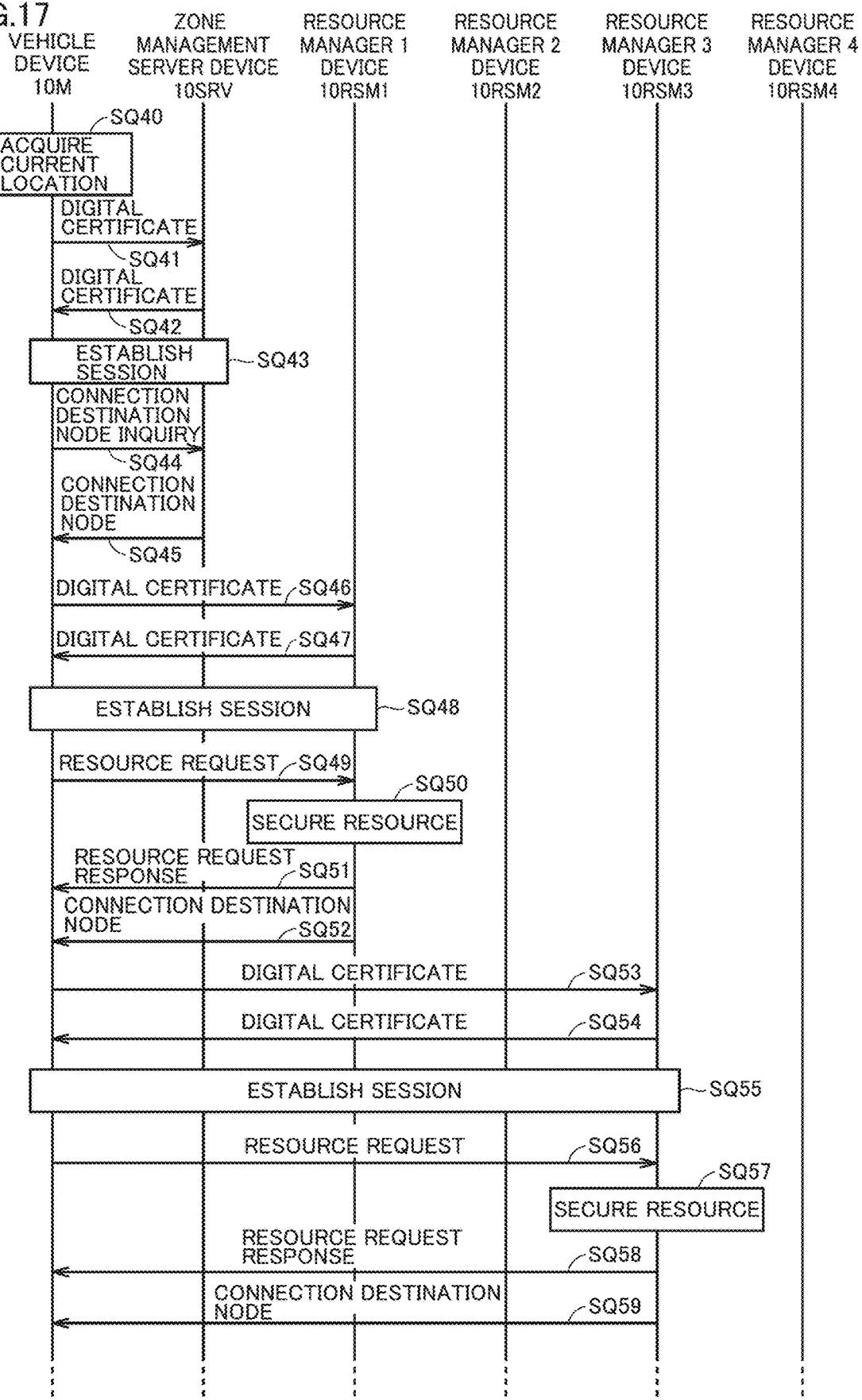

NETWORK SYSTEM, DEVICE, AND PROCESSING METHOD

CROSS-REFERENCE TO RELATED APPLICATIONS

This application is a Continuation Application of U.S. application Ser. No. 17/604,716, filed Oct. 18, 2021, which is a National Phase Entry of PCT/JP2020/016576, filed Apr. 15, 2020, which claims priority to Japanese Patent Application No. 2019-080299, filed Apr. 19, 2019, and which applications are incorporated herein by reference. To the extent appropriate, a claim of priority is made to each of the above-disclosed applications.

TECHNICAL FIELD

The present disclosure relates to a network system including a device having an authenticated IP address, the device, and a processing method in the network system.

BACKGROUND ART

The development of information and communication technology (ICT) has been remarkable in recent years, and devices connected to a network, such as the Internet, are not limited to information processing devices, such as conventional personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

Information of the location of such a device is important in providing various services. For example, JP 2012-504285 A (Patent Document 1) discloses a geolocation as a technique for identifying the actual geographical locations of computers, mobile devices, website visitors, and others connected to the Internet. In particular, Patent Document 1 discloses a technique for supporting the update of location information when the IP (Internet Protocol) address assigned to a general household customer changes.

Problem to be Solved by the Invention

As disclosed in Patent Document 1, it has been difficult to correctly determine the location information of a device depending on the framework of assigning an arbitrary IP address to the device.

SUMMARY OF THE INVENTION

The present disclosure provides a solution that can solve such a problem and provide various services using location information by adopting a framework that uses an authenticated IP address.

Means for Solving Problem

According to an aspect of the present disclosure, a network system including a plurality of devices is provided. Each of the plurality of devices includes: a communication unit for performing data communication with another device; a storage unit that stores a digital certificate including a public key for determining an IP address of the device itself; and a determination unit that determines an IP address of another device based on a public key included in a digital certificate received from the another device. The digital certificate includes location information associated with a corresponding device.

The location information may indicate any zone generated by dividing a zone hierarchically.

The location information may include a code reflecting a hierarchical structure of a target zone.

Any one of the plurality of devices may transmit a request for location information to be set in the device itself to another device associated with a zone in a hierarchy higher than a zone indicated by location information associated with the device itself.

The network system may further include a certificate authority that signs a digital certificate to be stored in a request source in response to a request from any one of the plurality of devices.

Any one of the plurality of devices may transmit information generated or collected by the device itself to another device after establishing a session by exchanging digital certificates between the device itself and the another device.

A first device of the plurality of devices may be configured to manage resources associated with the first device, and may be configured to allocate at least some of the managed resources in response to a request from a second device of the plurality of devices. Information relevant to the allocation of the resources may be shared between the first device and the second device.

Any one of the plurality of devices may respond with identification information for identifying a device associated with a current location in response to a request for the current location from another device.

Any one of the plurality of devices may have a function of managing a value that is a price for goods or services.

According to another aspect of the present disclosure, a device configuring a network system is provided. The device includes: a communication unit for performing data communication with another device; a storage unit that stores a digital certificate including a public key for determining an IP address of the device itself; and a determination unit that determines an IP address of another device based on a public key included in a digital certificate received from the another device. The digital certificate includes location information associated with a corresponding device.

According to still another aspect of the present disclosure, a processing method in a network system including first and second devices is provided. The processing method includes: a step in which the first device transmits a first digital certificate, which includes a first public key for determining an IP address of the first device, to the second device; a step in which the second device determines the IP address of the first device based on the first public key included in the first digital certificate received from the first device; a step in which the second device transmits a second digital certificate, which includes a second public key for determining an IP address of the second device, to the first device; and a step in which the first device determines the IP address of the second device based on the second public key included in the second digital certificate received from the second device. The digital certificate includes location information associated with a corresponding device.

Effect of the Invention

According to the present disclosure, it is possible to acquire the authenticated location information of the device and to provide various services using the authenticated location information.

BRIEF DESCRIPTION OF DRAWINGS

FIG. 5 is a schematic diagram for describing a zone ID used in the network system according to the present embodiment;

FIG. 12 is a schematic diagram for describing resource management in the application shown in FIG. 10;

FIG. 17 is a sequence diagram showing a processing procedure for realizing the application shown in FIG. 15.

MODE(S) FOR CARRYING OUT THE INVENTION

Figure 1:
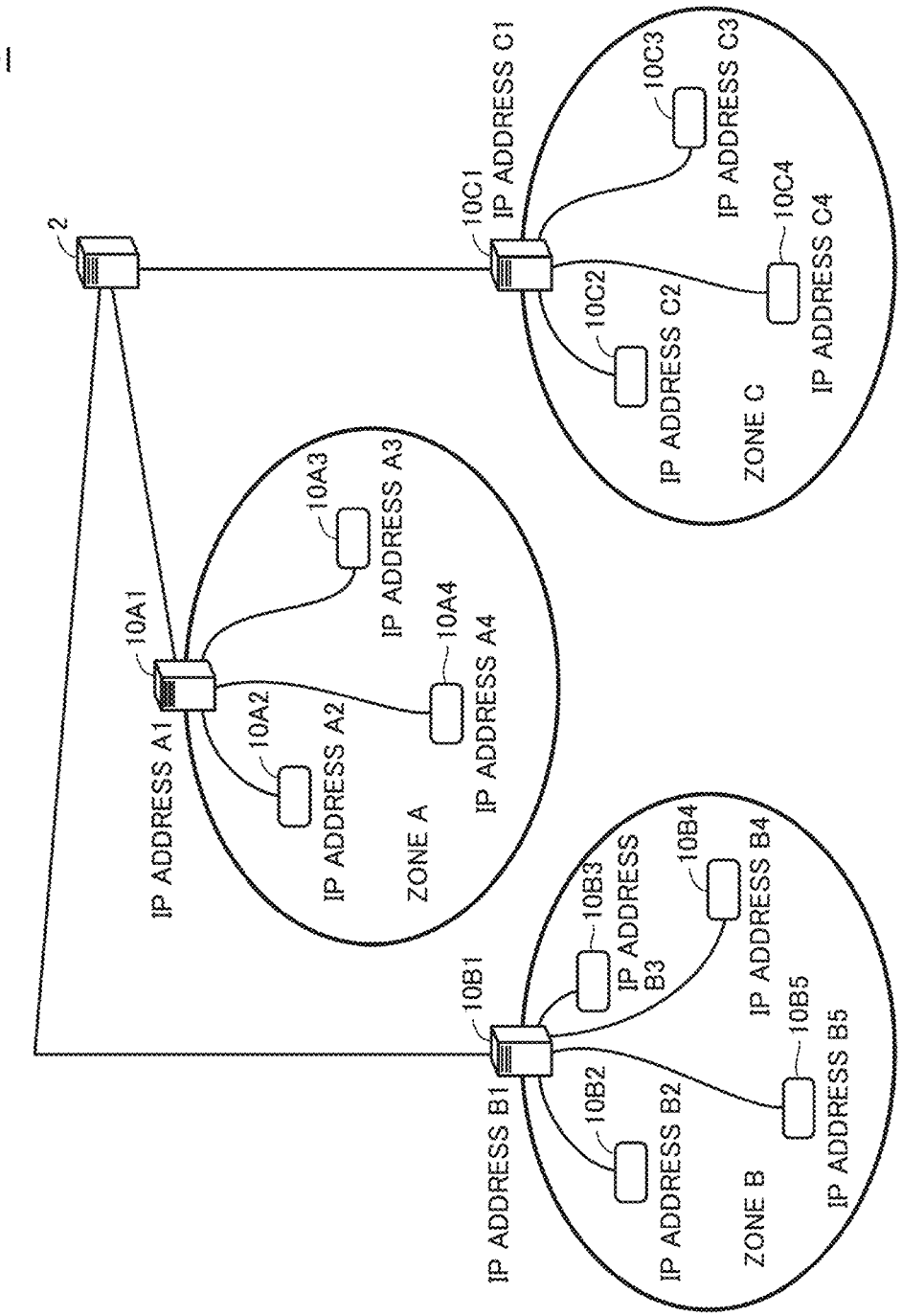
FIG. 1 is a schematic diagram showing an example of the overall configuration of a network system according to the present embodiment.

Hereinafter, an embodiment according to the present disclosure will be described in detail with reference to the diagrams. In addition, the same or corresponding portions in the diagrams are denoted by the same reference numerals, and the description thereof will not be repeated.

A. Overall Configuration of Network System 1

First, the overall configuration of a network system 1 according to the present embodiment will be described. The network system 1 has a function of managing and providing location information of one or more devices.

FIG. 1 is a schematic diagram showing an example of the overall configuration of the network system 1 according to the present embodiment. Referring to FIG. 1, the network system 1 includes a plurality of devices 10, and each device 10 is associated with a physical location or range. The location or range associated with each device 10 may be a location or range in which each device 10 is actually present, or may be a location or range in which each device 10 provides management or service.

In the example shown in FIG. 1, devices 10A1, 10B1, and 10C1 are present in association with three zones A, B, and C, respectively. Devices 10A2, 10A3, and 10A4 are further present in the zone A, devices 10B2, 10B3, 10B4, and 10B5 are further present in the zone B, and devices 10C2, 10C3, and 10C4 are further present in the zone C. In addition, each device may be simply generically referred to as "device 10".

In the network system 1 according to the present embodiment, location information associated with each device 10 can be determined and provided.

Each device 10 has an authenticated IP address. In this specification, the "authenticated IP address" means a state in which the validity of the IP address held by each device 10 is guaranteed for the communication destination or a third party. More specifically, the "authenticated IP address" means an IP address that is generated by an irreversible cryptographic hash function and is directly or indirectly authenticated by a certificate authority 2 (details thereof will be described later). By using such an "authenticated IP address", it can be guaranteed that the IP address used by each device 10 for data communication is not spoofed.

As a result, any device 10 included in the network system 1 is uniquely identified based on the IP address of each device 10. That is, since the IP address itself of each device serves as identification information for each device, the location information and the associated information can be determined and provided based on the identification information (that is, the IP address) of each device 10.

The IP address is assumed to be a global IP address that can also be used for data communication between the devices 10 connected to the Internet, but may be a private IP address that is used only in a specific network. The number of bits that make up an IP address differs depending on the version. In the currently established IPv4 (Internet Protocol Version 4), a 32-bit address section is defined, and in the currently established IPv6 (Internet Protocol Version 6), a 128-bit address section is defined. In the present embodiment, an IP address according to IPv6 will be mainly described. However, the present disclosure can also be applied to a network address defined by a larger number of bits or a network address defined by a smaller number of bits.

In this specification, the "device" includes any device having a function of performing data communication with other devices using the IP address of each device. The device 10 may be configured as a single communication device, may be configured as a part of any thing, or may be configured to be embedded in any thing.

More specifically, the device 10 may be, for example, a personal computer, a smartphone, a tablet, or a wearable device (for example, a smart watch or an AR glass) worn on the user's body (for example, an arm or a head). In addition, the device 10 may be a control device installed in a smart home appliance, a connected automobile, a factory, and the like or a part thereof.

The network system 1 may further include one or more certificate authorities 2. Each of the certificate authorities 2 may be a computer configured by one or more servers. By using the one or more certificate authorities 2, the IP address of each device 10 may be authenticated. However, any device 10 may be in charge of all or some of the functions provided by the certificate authority 2.

In the network system 1 according to the present embodiment, the devices 10 and the device 10 and the certificate authority 2 are connected to each other so that data communication through arbitrary wired communication or wireless communication is possible. A kind of peer-to-peer connection is used for communication between the devices 10 and communication between the device 10 and the certificate authority 2. Any protocol including TCP (Transmission Control Protocol) and UDP (User Datagram Protocol) can be adopted for this communication.

Each of the device 10 and the certificate authority 2 connected to the network can be regarded as a "node" of the network, and in the following description, each of the device 10 and the certificate authority 2 may be referred to as a "node".

B. Hardware Configuration Example of Device 10

Next, a hardware configuration example of the device 10 used in the network system 1 according to the present embodiment will be described.

Figure 2:
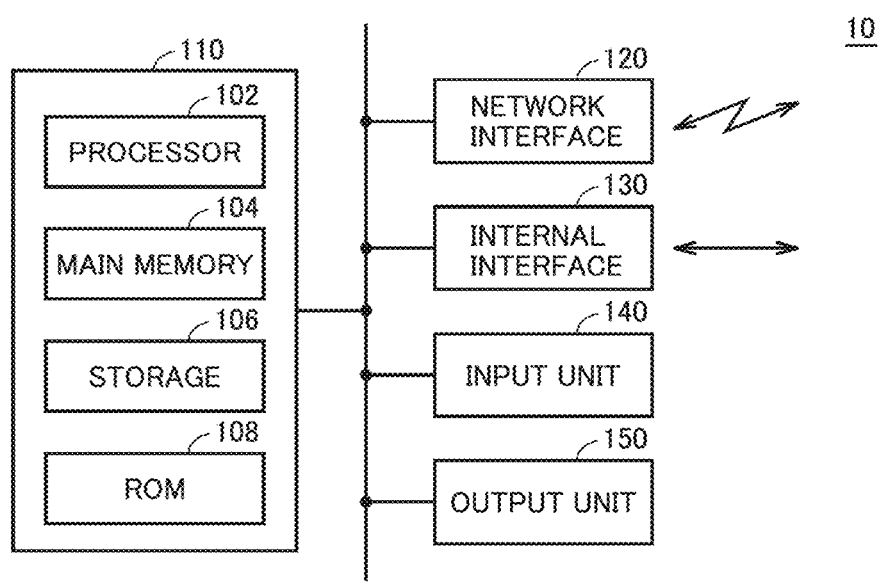
FIG. 2 is a schematic diagram showing a hardware configuration example of a device included in the network system according to the present embodiment.

FIG. 2 is a schematic diagram showing a hardware configuration example of the device 10 included in the network system 1 according to the present embodiment. Referring to FIG. 2, the device 10 includes a control unit 110, which is a processing circuitry, as a main component.

The control unit 110 is a calculation subject for providing functions and executing processes according to the present embodiment. The control unit 110 may be configured such that a processor executes computer-readable instructions stored in a memory by using a processor and a memory shown in FIG. 2. Alternatively, the control unit 110 may be realized by using a hard-wired logic circuit such as an ASIC (Application Specific Integrated Circuit) in which a circuit corresponding to computer-readable instruction is provided. In addition, the control unit 110 may be realized by realizing a circuit corresponding to computer-readable instructions on an FPGA (field-programmable gate array). In addition, the control unit 110 may be realized by appropriately combining a processor, a memory, an ASIC, an FPGA, and the like.

In a configuration using the processor and the memory shown in FIG. 2, the control unit 110 includes a processor 102, a main memory 104, a storage 106, and a ROM (Read Only Memory) 108.

The processor 102 is an arithmetic circuit that sequentially reads and executes computer-readable instructions. The processor 102 may be, for example, a CPU (Central Processing Unit), an MPU (Micro Processing Unit), or a GPU (Graphics Processing Unit). The control unit 110 may be realized by using a plurality of processors 102 (multi-processor configuration), or the control unit 110 may be realized by using a processor having a plurality of cores (multicore configuration).

The main memory 104 is a volatile storage device, such as a DRAM (Dynamic Random Access Memory) or a SRAM (Static Random Access Memory). The processor 102 loads a designated program, among various programs stored in the storage 106 or the ROM 108, into the main memory 104 and cooperates with the main memory 104 to realize various processes according to the present embodiment.

The storage 106 is, for example, a non-volatile storage device such as an HDD (Hard Disk Drive), an SSD (Solid State Drive), or a flash memory. The storage 106 stores various programs executed by the processor 102 or various kinds of data described later.

The ROM 108 fixedly stores various programs executed by the processor 102 or various kinds of data described later.

The device 10 further includes a network interface 120 for connecting the device 10 to the network. The network interface 120 corresponds to a communication unit for performing data communication with another device 10 through the network.

Examples of the network interface 120 include wired connection terminals, such as serial ports including an Ethernet (registered trademark) port, a USB (Universal Serial Bus) port, and an IEEE1394 and a legacy parallel port. Alternatively, the network interface 120 may include processing circuits and antennas for wireless communication with devices, routers, mobile base stations, and the like. The wireless communication supported by the network interface 120 may be any of Wi-Fi (registered trademark), Bluetooth (registered trademark), ZigBee (registered trademark), LPWA (Low Power Wide Area), GSM (registered trademark), W-CDMA, CDMA200, LTE (Long Term Evolution), and 5th generation mobile communication system (5G), for example.

The device 10 may include an internal interface 130, an input unit 140, and an output unit 150 as optional components.

The internal interface 130 performs data communication with a target object when the device 10 is configured as a part of the object or provided in the object. Examples of the internal interface 130 include wired connection terminals, such as serial ports including a USB (Universal Serial Bus) port and an IEEE1394 and a legacy parallel port. Alternatively, the internal interface 130 may include a circuit for acquiring an electrical signal, such as an analog/digital conversion circuit.

The input unit 140 is a component for receiving an input operation of a user who operates the device 10. The input unit 140 may be, for example, a keyboard, a mouse, a touch panel disposed on a display device, or an operation button disposed in the housing of the device 10.

The output unit 150 is a component for presenting the processing result of the processor 102 to the outside. The output unit 150 may be, for example, an LCD (Liquid Crystal Display) or an organic EL (Electro-Luminescence) display. In addition, the output unit 150 may be a head-mounted display mounted on the user's head, or may be a projector that projects an image on the screen. Alternatively, the output unit 150 may be an indicator or the like disposed in the housing of the device 10.

Since the input unit 140 and the output unit 150 are optional components, the input unit 140 and the output unit 150 may be connected from the outside of the device 10 through any interface, such as a USB, for example.

The device 10 may further include a component for reading various programs and/or various kinds of data from non-transitory media in which various programs (computer-readable instructions) and/or various kinds of data are stored. The media may be, for example, an optical medium, such as a DVD (Digital Versatile Disc), or a semiconductor medium, such as a USB memory.

In addition, instead of installing various programs and/or various kinds of data on the device 10 through the media, necessary programs and data may be installed on the device 10 from a distribution server on the network. In this case, the necessary programs and data are acquired through the network interface 120.

Providing the functions and executing the processes according to the present embodiment are realized by the control unit 110, and the technical scope of this application includes at least the hardware and/or the software for realizing the control unit 110. As described above, for the hardware, not only a configuration including a processor and a memory but also a configuration using a hard-wired circuit using an ASIC or the like or a configuration using an FPGA can be included. That is, the control unit 110 can be realized by installing a program on a general-purpose computer, or can be realized as a dedicated chip.

In addition, the software executed by the processor may include not only software distributed through the media but also software appropriately downloaded through a distribution server.

In addition, the configuration for providing the functions and executing the processes according to the present embodiment is not limited to the control unit 110 shown in FIG. 2, and can be implemented by using any technology according to the time of the implementation.

C. Authenticated IP Address

Next, an example of a method of realizing an authenticated IP address in the network system 1 according to the present embodiment will be described.

In the network system 1 according to the present embodiment, as an example, the IP address of each device 10 is authenticated by using a public key infrastructure (PKI).

Figure 3:
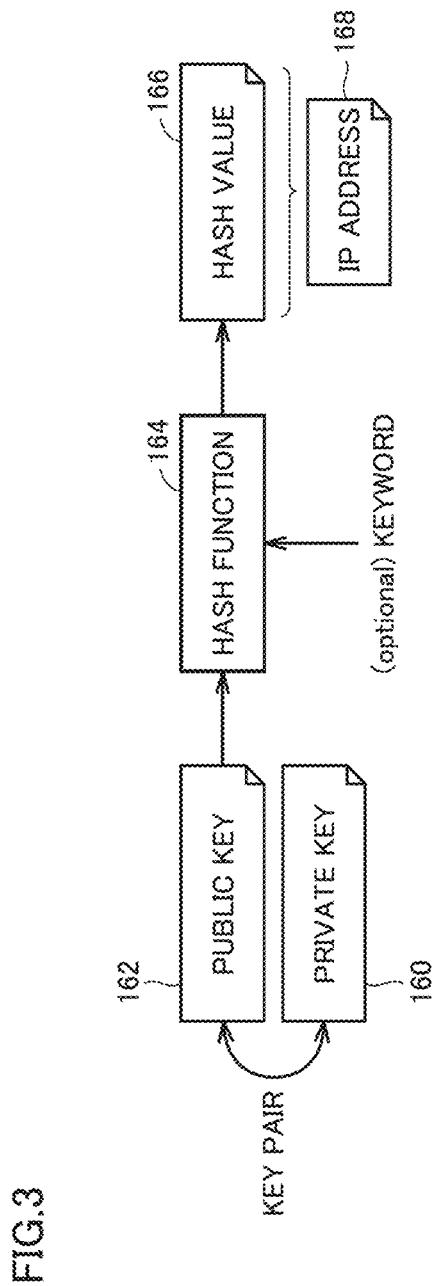
FIG. 3 is a diagram for describing an IP address authentication processing example in the network system according to the present embodiment.

FIG. 3 is a diagram for describing an IP address authentication processing example in the network system 1 according to the present embodiment. Referring to FIG. 3, the device 10 has a key pair of a private key 160 and a public key 162. A hash value 166 is calculated by inputting the public key 162 into a predetermined hash function 164, and the entirety or part of the calculated hash value 166 is used as an IP address 168 of the device 10.

By sharing the predetermined hash function 164 among the devices 10, the IP address 168 of the device 10 that is a transmission source of the public key 162 can be uniquely determined based on the public key 162 acquired from another device 10. The public key 162 is to be transmitted together with a digital certificate 170 or in a state of being included in the digital certificate 170, so that the public key 162 (that is, the validity of the determined IP address 168) can be ensured based on the digital certificate 170. That is, by sharing the predetermined hash function 164 among the devices 10, each device 10 has a logic to determine the IP address of another device 10 based on the public key 162 included in the digital certificate 170 received from another device 10.

As described above, in the network system 1 according to the present embodiment, the IP address 168 itself can be authenticated. By holding such an authenticated IP address 168 in the device itself, it is possible to build an independent network without using a statically or dynamically assigned IP address for each device.

The private key 160 and the public key 162, which are a key pair, may be generated by the device 10 itself, or may be provided from the outside and stored in the device 10 in advance. When the private key 160 and the public key 162 are provided from the outside, the device 10 may acquire only the private key 160 and generate the public key 162 by itself.

As an example of a method of generating the public key 162 which is a key pair, a bit string of a predetermined length (for example, 512 bits) generated by a random number generator may be used as the private key 160, and the public key 162 having a bit string of a predetermined length (for example, 256 bits) may be generated from the private key 160 according to a known cryptographic algorithm (for example, an elliptic curve cryptographic algorithm). In addition, when the device 10 itself generates the key pair, the random number generator may be realized by using the function provided by the OS, or may be realized by using a hard-wired circuit, such as an ASIC.

As the hash function 164, a known irreversible cryptographic hash function (for example, BLAKE) can be used. The hash function 164 calculates the hash value 166 having a bit string of a predetermined length (for example, 256 bits).

Not only the public key 162 but also an arbitrary keyword may be input to the hash function 164. As an arbitrary keyword, a message associated with a predetermined organization may be used. As the message associated with a predetermined organization, a message including the name of the trademark owned by the predetermined organization may be used. For example, the name (for example, "connectFree") of a registered trademark owned by the predetermined organization may be used as a keyword to be input to the hash function 164. By adopting such an implementation method, it is possible to prevent a third party other than the predetermined organization from implementing the network system 1 according to the present embodiment, a related method or program, and the like without the permission of the predetermined organization.

The entirety or part of the hash value 166 calculated by the hash function 164 is used as the IP address 168. For example, when a 256-bit (64 digits in hexadecimal notation) hash value 166 is calculated, any 32 digits (for example, first 32 digits) of the 64-digit hash value 166 may be used as the IP address 168 (128 bits) corresponding to IPv6. Alternatively, the first eight digits of the 64-digit hash value 166 may be determined as the IP address 168 (32 bits) corresponding to IPv4.

Alternatively, a 128-bit hash value 166 may be calculated from the hash function 164 in consideration of the IP address 168 (128 bits) corresponding to IPv6. In this case, the entirety of the calculated hash value 166 can be determined as the IP address 168 (128 bits) corresponding to IPv6.

In addition, the determined IP address may include a predetermined eigenvalue (unique character string) for identification.

As an example, the first two digits (first and second digits from the beginning) of the IP address 168 in hexadecimal notation may be fixed to a predetermined unique character string (for example, "FC"). As another example, a value (type identification information) indicating the type of the device 10 may be embedded in the third and fourth digits from the beginning of the IP address 168 in hexadecimal notation.

Usually, since the hash function 164 is a one-way function, the public key 162 cannot be calculated back from the IP address 168. For this reason, the private key 160 and the public key 162 may be repeatedly generated using a random number generator until the determined IP address 168 satisfies predetermined conditions (in this case, all or some of the first four digits become a predetermined eigenvalue).

In this manner, by making a predetermined eigenvalue (for example, the first two digits are "FC") for identification be included in the IP address 168, a third party can determine whether or not the IP address 168 of the device 10 has been determined by the device 10 itself. In this manner, by making the value indicating the type of the device 10 be included in the IP address 168, a third party can identify the type of the device 10 from the determined IP address 168.

Figure 4:
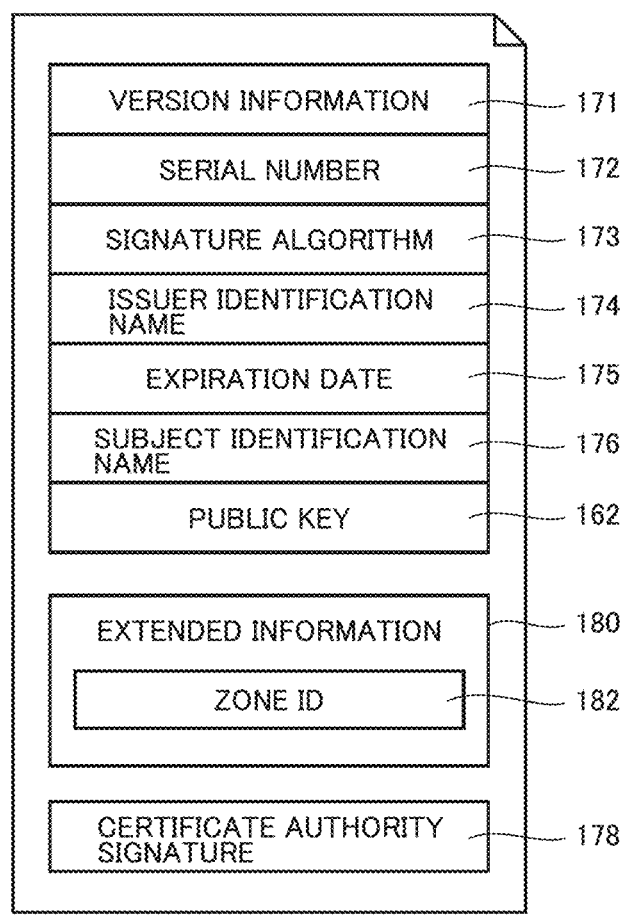
FIG. 4 is a diagram showing an example of a digital certificate used in the network system according to the present embodiment.

FIG. 4 is a diagram showing an example of the digital certificate 170 used in the network system 1 according to the present embodiment. Each device 10 holds the digital certificate 170 shown in FIG. 4, and transmits the digital certificate 170 to another device 10 as needed. The digital certificate 170 is typically stored in the storage 106 or the ROM 108 (see FIG. 2) of the device 10. That is, the storage 106 or the ROM 108 of the device 10 corresponds to a storage unit that stores the digital certificate 170.

The digital certificate 170 shown in FIG. 4 may be created in advance by the certificate authority 2 and provided to each device 10, or may be created by each device 10 itself (however, the certificate authority signature may be the signature of the device 10 itself). When the certificate authority 2 issues the digital certificate 170, the device 10 transmits a request for issuing a digital certificate (hereinafter, also referred to as a "certificate signature request") to the certificate authority 2 together with the public key 162 that the device 10 has. In response to the certificate signature request received from the device 10, the certificate authority 2 registers the public key 162 and issues a digital certificate 170 including a certificate authority signature 178 generated according to a predetermined algorithm. That is, the certificate authority 2 signs the digital certificate 170 to be stored in the request source in response to the certificate signature request from any device.

In FIG. 4, as an example, the digital certificate 170 according to X.509v3 certificate format is shown. More specifically, referring to FIG. 4, the digital certificate 170 held by each device 10 includes version information 171, a serial number 172, a signature algorithm 173, an issuer identification name 174, an expiration date 175, a subject identification name 176, the public key 162, the certificate authority signature 178, and extended information 180.

The version information 171 indicates the version information of the certificate format. The serial number 172 indicates a serial number in the issuing entity (the certificate authority 2 or the device 10) of the digital certificate 170. The signature algorithm 173 indicates an algorithm used to generate the certificate authority signature 178 included in the digital certificate 170. The issuer identification name 174 indicates information for identifying the issuing entity (the certificate authority 2 or the device 10) of the digital certificate 170. The expiration date 175 indicates the expiration date of the digital certificate 170. The subject identification name 176 indicates information for identifying a person for whom the digital certificate 170 is to be issued (usually, the device 10 holding the digital certificate 170). The public key 162 is the public key 162 held by the device 10 holding the digital certificate 170, and is used to determine the IP address of the device itself.

The certificate authority signature 178 is a signature (hash value) generated by the certificate authority 2.

The extended information 180 can include arbitrary information. In the network system 1 according to the present embodiment, a zone ID 182 (details will be described later) indicating location information associated with each device 10 is included. The zone ID 182 includes location information associated with a device in which the digital certificate 170 is stored (that is, a device corresponding to the zone ID 182). By referring to the zone ID 182 included in the digital certificate 170, the location or range in which each device 10 is present can be easily identified.

D. Zone ID

Next, the details of a zone ID used in the network system 1 according to the present embodiment will be described.
(d1: Zone ID Determination and System)

FIG. 5 is a schematic diagram for describing a zone ID used in the network system 1 according to the present embodiment. Referring to FIG. 5, in the present embodiment, the range is hierarchically divided according to the request. FIG. 5 shows an example using the quadtree space division. However, the present invention is not limited thereto, and any division method can be used.

More specifically, a zone in which a zone ID can be set is divided into four zones A to D. That is, the highest zone IDs in FIG. 5 are "A", "B", "C", and "D".

Each divided zone can be further divided into four parts. In the example shown in FIG. 5, the zone having a zone ID "A" is further divided into four parts. The zone IDs of the respective divided zones are "AA", "AB", "AC", and "AD".

The zone having a zone ID "AA" is further divided into four parts. The zone IDs of the respective divided zones are "AAA", "AAB", "AAC", and "AAD". Similarly, the zone having a zone ID "AB" and the zone having a zone ID "AC" are each divided into four parts. That is, the zone IDs of zones obtained by dividing the zone having a zone ID "AB" into four parts are "ABA", "ABB", "ABC", and "ABD", and the zone IDs of zones obtained by dividing the zone having a zone ID "AC" into four parts are "ACA", "ACB", "ACC", and "ACD".

Similarly, the zone having a zone ID "D" is divided into four parts, and some of the divided zones are further divided into four parts.

In this manner, the location information can be determined by repeating the operation of dividing the entire target zone or a part of the target zone into four parts up to the required size. That is, the determined location information indicates any zone generated by dividing a zone hierarchically.

Figure 6:
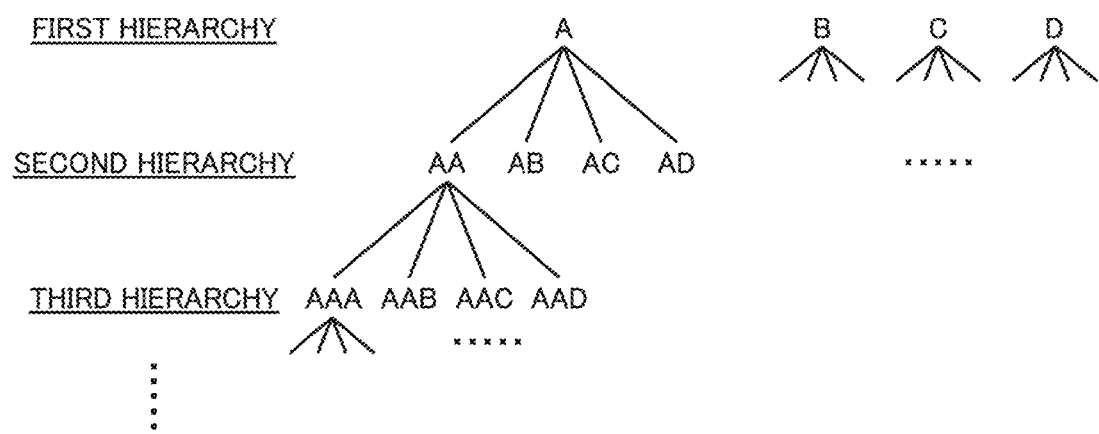
FIG. 6 is a schematic diagram for describing the code system of a zone ID used in the network system according to the present embodiment.

FIG. 6 is a schematic diagram for describing the code system of a zone ID used in the network system 1 according to the present embodiment. An example of the code system shown in FIG. 6 corresponds to the zone division shown in FIG. 5.

Referring to FIG. 6, four zone IDs "A", "B", "C", and "D" are assigned to the first hierarchy. In the second hierarchy, a zone ID obtained by further adding a character for identification to the entire zone ID of the corresponding first layer is used. For example, for the four zones obtained by dividing the zone ID "A", "AA", "AB", "AC", and "AD" obtained by adding "A", "B", "C", and "D" as identification characters after "A" are used.

Similarly, in the third hierarchy, a zone ID obtained by further adding a character for identification to the entire zone ID of the corresponding second hierarchy is used. For example, for the four zones obtained by dividing the zone ID "AA", "AAA", "AAB", "AAC", and "AAD" obtained by adding "A", "B", "C", and "D" as identification characters after "AA" are used.

Hereinafter, the zone ID is determined according to the same rule even in the case of a deeper hierarchy. In this manner, the zone ID, which is the location information, is configured to include a code reflecting the hierarchical structure of the target zone. In the network system 1 according to the present embodiment, a zone ID including the entire zone ID of the upper hierarchy is used. Therefore, for an arbitrary zone ID, a zone ID existing above the arbitrary zone ID can be uniquely identified. For example, a zone to which "AAA" is added as a zone ID can be determined to be a partial area of a zone to which "AA" is added as a zone ID, and can also be determined as a partial area of a zone to which "A" is added as a zone ID.

In FIGS. 5 and 6, for convenience of explanation, an example in which one alphabetic character is added each time the hierarchy is deepened is shown. However, the invention is not limited thereto, and identification information (characters, numbers, and the like) having an arbitrary length may be sequentially added according to a predetermined rule.

In FIGS. 5 and 6, for convenience of explanation, the state of division into four parts is defined as the highest hierarchy (first hierarchy), but the highest hierarchy may be any number of zones. In addition, it is not necessary to limit the number of divisions to 4 for the second hierarchy and below, and sequential divisions into any number are possible.

In FIG. 5, for convenience of explanation, an example in which the rectangular zone is sequentially divided is shown. However, this is merely a logical expression, and any unit can be set for zones in each hierarchy according to the application to be applied. That is, the "zone" shown in FIG. 5 is not necessarily limited to a physical range, but may include zone divisions defined according to artificially arranged rules. For example, the hierarchy of the "zone" may be associated with an artificially arranged address notation (for example, "prefecture", "city", "town", "address", and "room number"). In addition, the number of divisions and the division hierarchy of the "zone" shown in FIG. 5 are not limited in any way. For example, the zone ID corresponding to the address of the first store may be further divided and the zone ID may be assigned to each seat.

By acquiring the zone ID from each communicable device 10 and mapping the zone ID on the map, it is also possible to embody the location where each device 10 is present.

(d2: Zone ID Setting and Updating)

Next, a processing example relevant to the setting and updating of a zone ID for each device 10 will be described. A predetermined zone ID may be set for each device 10, and the digital certificate 170 including the set zone ID may be issued by the certificate authority 2. Alternatively, after the device 10 is connected to the network system 1, a zone ID may be set for the connected device 10 based on the connection relationship on the network. Hereinafter, a processing example, such as setting a zone ID based on the connection relationship on the network and issuing the digital certificate 170, will be described.

Figure 7:
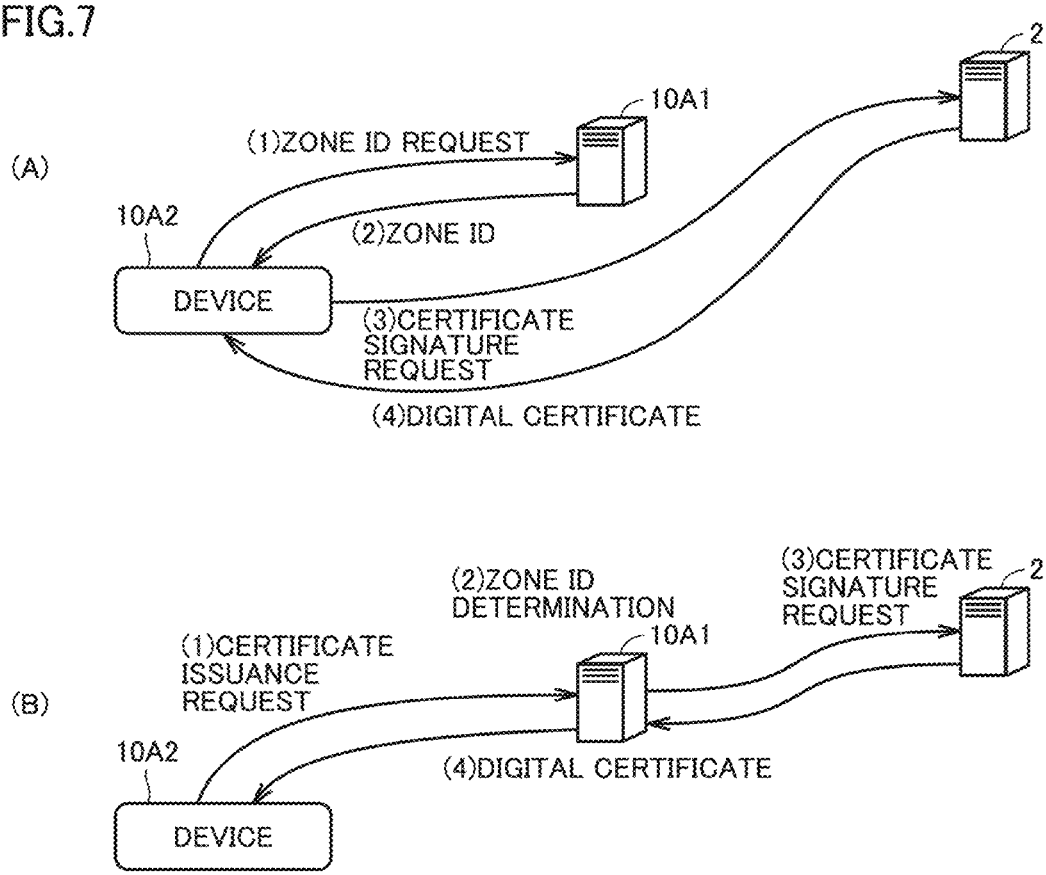
FIG. 7 is a schematic diagram for describing a process relevant to the setting of a zone ID in the network system according to the present embodiment.

FIG. 7 is a schematic diagram for describing a process relevant to the setting of a zone ID in the network system 1 according to the present embodiment. FIG. 7 shows a processing example when the device 10A2 (see FIG. 1) is connected to the network of the device 10A1 associated with the zone A.

FIG. 7(A) shows an example in which the device 10A2 requests the device 10A1 connected to the same network to assign a zone ID. In the example shown in FIG. 7(A), the device 10A2 transmits a zone ID request to the device 10A1 ((1) zone ID request). In response to the zone ID request, the device 10A1 determines a zone ID by further adding identification information to a zone ID assigned to the device itself, and responds to the device 10A2 ((2) zone ID). Then, the device 10A2 transmits a certificate signature request, which includes the zone ID assigned by the device 10A1 and the public key 162 of the device itself, to the certificate authority 2 ((3) certificate signature request). In response to the certificate signature request, the certificate authority 2 generates the digital certificate 170 for the device 10A2 and transmits the digital certificate 170 to the device 10A2 ((4) digital certificate). The device 10A2 stores the digital certificate 170 from the certificate authority 2, and uses the digital certificate 170 for data communication with another device.

In this manner, the device 10 in the lower hierarchy transmits a request for location information, which is to be set in the device itself, to another device associated with a zone in the hierarchy higher than a zone indicated by the zone ID (location information) associated with the device itself.

FIG. 7(B) shows an example in which the request from the device 10A2 is a request for making the device 10A1 connected to the same network to issue the digital certificate 170. In the example shown in FIG. 7(B), the device 10A2 requests the device 10A1 to issue the digital certificate 170 ((1) certificate issuance request). The request for issuance of the digital certificate 170 includes the public key 162 of the device 10A2. In response to the request for issuance of the digital certificate 170, the device 10A1 determines a zone ID of the device 10A2 by further adding identification information to a zone ID assigned to the device itself ((2) zone ID determination). Then, the device 10A2 transmits a certificate signature request, which includes the zone ID determined for the device 10A1 and the public key 162 of the device 10A2, to the certificate authority 2 ((3) certificate signature request). In response to the certificate signature request, the certificate authority 2 generates the digital certificate 170 for the device 10A2 and transmits the digital certificate 170 to the device 10A1, and the digital certificate 170 is delivered to the device 10A2 through the device 10A1 ((4) digital certificate). The device 10A2 stores the digital certificate 170 from the certificate authority 2, and uses the digital certificate 170 for data communication with another device.

The process relevant to the zone ID setting shown in FIG. 7 is an example, and any setting method may be adopted. In addition, when the device 10 is connected to another network, the process relevant to the zone ID setting shown in FIG. 7 may be re-executed. The zone ID can be updated by such re-execution.

Hereinafter, some application examples using location information according to the present embodiment will be described. In the application described below, each device may have a function of managing money or a value (including ordinary currency and virtual currency) that is a price for goods or services. For example, by giving a budget to each device, it is possible to realize payment processing without human intervention.

E. First Application Example

As a first application example, a configuration used for a fire alarm or the like disposed in a building will be described.

Figure 8:
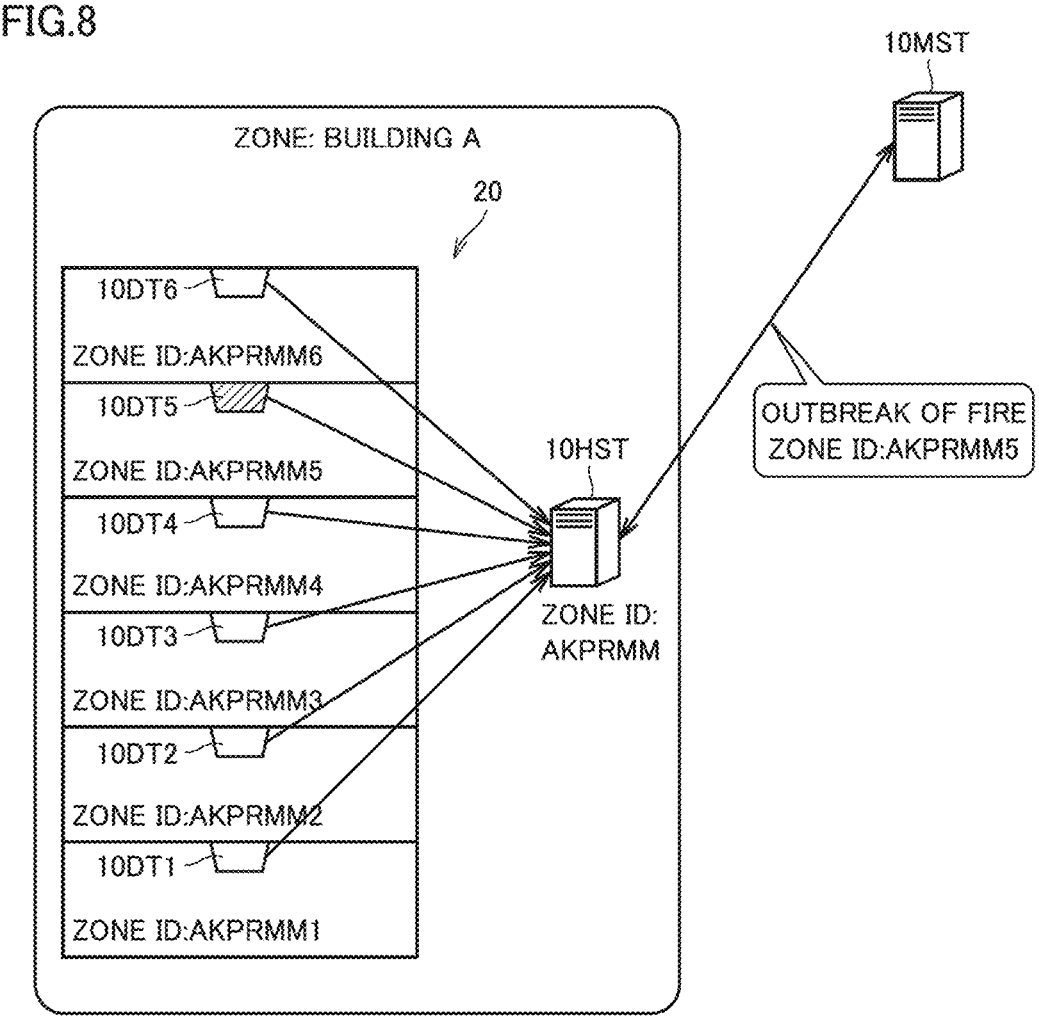
FIG. 8 is a schematic diagram showing an example of an application using location information provided by the network system according to the present embodiment.

FIG. 8 is a schematic diagram showing an example of an application using location information provided by the network system 1 according to the present embodiment. Referring to FIG. 8, it is assumed that devices 10DT1 to 10DT6, which are fire alarms, are disposed on each floor of the building. A device 10HST, which is a host that collects various kinds of information including fire detection of a building, is also disposed. The device 10HST can perform data communication with each of the devices 10DT1 to 10DT6. In addition, the device 10HST can perform data communication with a device 10MST, which is a host disposed in the fire department or a host that collects notifications to the fire department.

In the example shown in FIG. 8, it is assumed that one building is a management unit of a zone ID, and "AKPRMM" is assigned as a zone ID. In addition, zone IDs are assigned to each floor of the building ("AKPRMM1" to "AKPRMM6").

For example, when a fire alarm (device 10DT5) located on the fifth floor detects a fire, the host (device 10HST) is notified of the fire detection information. Between the device 10DT5 and the device 10HST, a session for data communication is established by exchanging the digital certificates 170 including the zone ID therebetween. The digital certificate 170 to be exchanged also includes the zone ID of the device 10DT5. In addition, the device 10DT5 identifies the zone ID of the device 10 in the upper hierarchy from "AKPRMM5", which is the zone ID of the device itself. In this example, it can be identified that "AKPRMM", which is obtained by removing the last character from "AKPRMM5" that is the zone ID of the device 10DT5, is the notification destination.

When the fire detection information is received from the device 10DT5, the device 10HST identifies the zone ID of the device 10DT5 by referring to the digital certificate 170 acquired in advance from the device 10DT5, and notifies the device 10MST of the fire detection information together with the identified zone ID. The device 10MST can identify the location of the fire alarm (device 10DT5) where the fire has been detected based on the notification information from the device 10HST. Then, the necessary action is taken according to the identified location.

Thus, by applying the network system 1 according to the present embodiment, it is possible to immediately acquire on which floor of the building an abnormality, such as a fire, has occurred.

Figure 9:
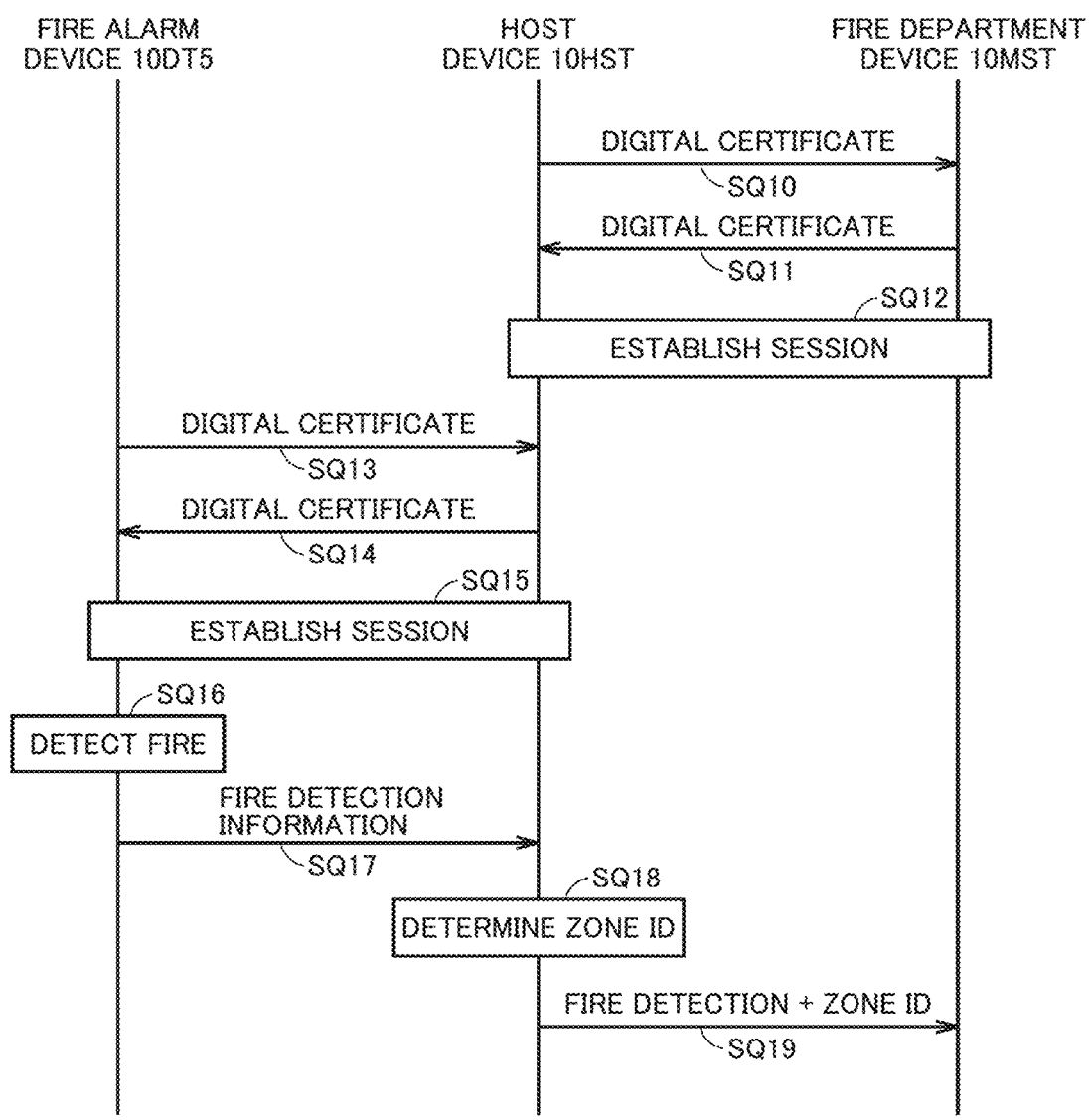
FIG. 9 is a sequence diagram showing a processing procedure for realizing the application shown in FIG. 8.

FIG. 9 is a sequence diagram showing a processing procedure for realizing the application shown in FIG. 8. Referring to FIG. 9, a process of establishing a session is first executed between devices. The device 10HST, which is a host, transmits the digital certificate 170 of the device itself to the device 10MST of the fire department (sequence SQ10), and the device 10MST also transmits the digital certificate 170 of the device itself to the device 10HST (sequence SQ11). The device 10HST and the device 10MST establish a session by exchanging the digital certificates 170 therebetween (sequence SQ12).

In addition, the device 10DT5, which is a fire alarm, transmits the digital certificate 170 of the device itself to the device 10HST (sequence SQ13), and the device 10HST also transmits the digital certificate 170 of the device itself to the device 10DT5 (sequence SQ14). The device 10DT5 and the device 10HST establish a session by exchanging the digital certificates 170 therebetween (sequence SQ15). For convenience of explanation, FIG. 9 shows only the process of establishing a session between the device 10DT5 and the device 10HST. However, a session is established in the same manner between the device 10HST and the other devices 10DT1 to 10DT4 and 10DT6.

Thereafter, when the device 10DT5 detects a fire (sequence SQ16), the device 10DT5 transmits the fire detection information to the device 10HST (sequence SQ17). When the fire detection information is received from the device 10DT5, the device 10HST determines the zone ID of the device 10DT5 with reference to the digital certificate 170 received from the device 10DT5 (sequence SQ18). Then, the device 10DT5 transmits the fire detection information from the device 10DT5 and the determined zone ID of the device 10DT5 to the device 10MST (sequence SQ19).

In this manner, the device 10DT5 configuring the network system 1 transmits the information generated or collected by the device itself to the device 10HST after establishing a session by exchanging the digital certificates 170 between the device itself and the device 10HST. The device 10DT5 can be reliably identified based on the contents of the digital certificate 170 used to establish the session.

By the above processing procedure, the information detected by the fire alarm is transmitted to the fire department and the like together with the location of the detected fire alarm. Therefore, it is possible to provide the location information necessary for the fire extinguishing activity to the fire department.

In addition, in FIGS. 8 and 9, an example of notification by the fire alarm is shown as a typical example. However, the invention is not limited thereto, and can be applied to devices involved in arbitrary monitoring and detection (for example, an intrusion detection device using an infrared sensor or a camera).

In addition, a device such as a fire alarm or a sprinkler may pre-hold or manage a deposit that allows to pay for the water needed in the event of a fire. By implementing such a budget and payment function, when a device such as a fire alarm or a sprinkler detects a fire, it is possible to provide the information to the fire department and the like and to autonomously manage the cost without the intervention of a person such as an administrator.

F. Second Application Example

As a second application example, a configuration for managing the right to use services such as reservation and use of a hotel room will be described.

Figure 10:
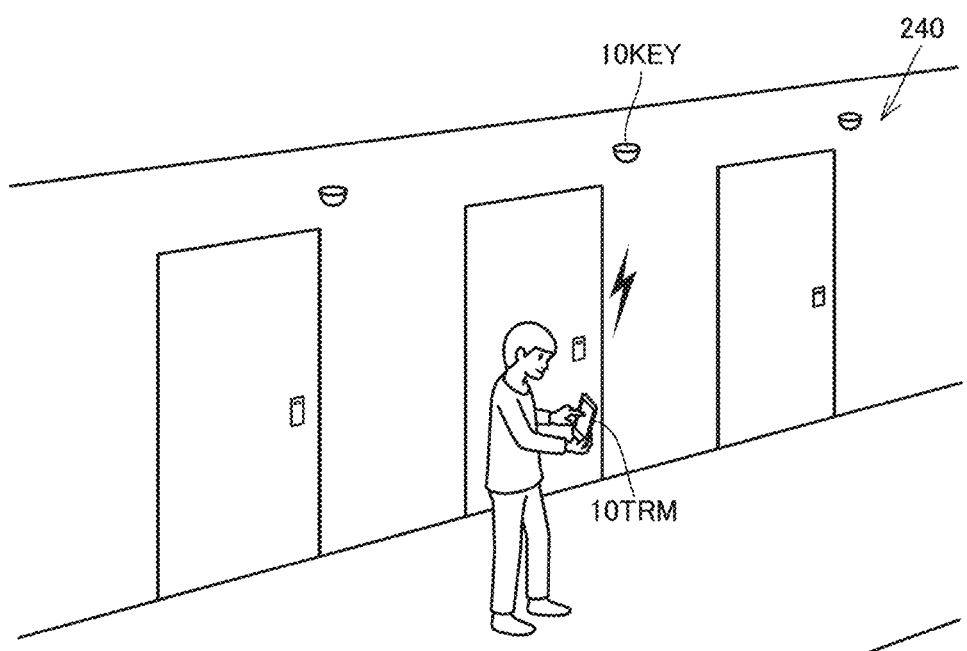
FIG. 10 is a schematic diagram showing another example of the application using location information provided by the network system according to the present embodiment.

FIG. 10 is a schematic diagram showing another example of the application using location information provided by the network system 1 according to the present embodiment. In the application shown in FIG. 10, a device 10TRM, which is a mobile terminal held by the user, can be used as an electronic key (use certificate). A device 10KEY, which is a locking device, is disposed in front of each room of an accommodation facility 40. When the user operates the device 10TRM, which is his or her own mobile terminal, to make a reservation for use on a reservation site or the like, ticket information to be described later is provided to the mobile terminal and the target locking device. The same ticket information is shared between the mobile terminal and the target locking device. Therefore, when the user approaches the reserved room, communication is performed between the user's mobile terminal and the target locking device to unlock the room. In addition, the communication between the mobile terminal and the locking device may be automatically started, or may be started after the user explicitly performs an operation.

Figure 11:
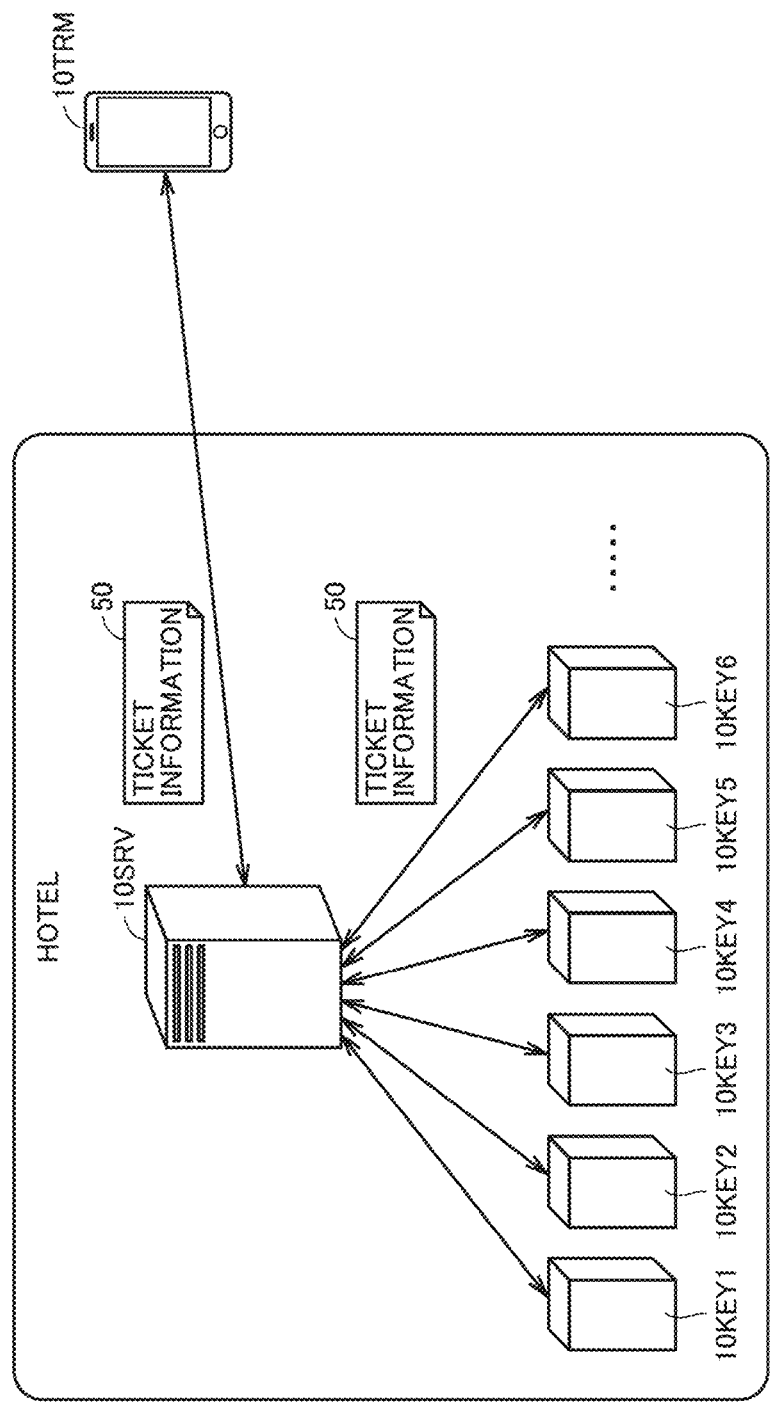
FIG. 11 is a schematic diagram showing a system configuration example for realizing the application shown in FIG. 10.

FIG. 11 is a schematic diagram showing a system configuration example for realizing the application shown in FIG. 10. Referring to FIG. 11, devices 10KEY1, 10KEY2, 10KEY3, . . . , which are one or more locking devices associated with each room of the hotel, are disposed. The devices 10KEY1, 10KEY2, 10KEY3, . . . can perform data communication with a device 10SRV, which is a server that manages hotel reservations and the like.

The device 10SRV, which is a server, can also perform data communication with the device 10TRM, which is a mobile terminal.

The device 10SRV, which is a server, manages reservations for each room managed by the devices 10KEY1, 10KEY2, 10KEY3, ..., which are locking devices. Assuming that the room managed by each locking device is a "resource", the device 10SRV can also be regarded as managing the resources to be provided according to the requested service. The information for providing the service determined according to the resource management to be described later is transmitted as ticket information 50 to the device 10TRM, which is a mobile terminal, and the device 10KEY that provides a resource.

FIG. 12 is a schematic diagram for describing resource management in the application shown in FIG. 10. Referring to FIG. 12, the device 10SRV, which is a server, manages time as a resource for each room associated with the devices 10KEY1, 10KEY2, 10KEY3, .... Since each room of the hotel accepts only one use reservation (that is, service) at a certain time, the service is assigned to the time axis so as not to overlap.

In the network system 1 according to the present embodiment, since each device 10 has an authenticated IP address, the authenticated IP address of the device 10 that makes a request for the service can also be used in resource management.

When the resource can be secured for the requested service (reservation) as shown in FIG. 12, the ticket information 50 is transmitted to the device 10 that has made a request for the service and the device 10 that provides the secured resource.

Figure 13:
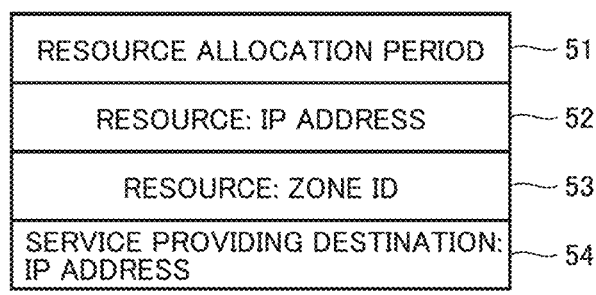
FIG. 13 is a diagram showing an example of ticket information used in the application shown in FIG. 10.

FIG. 13 is a diagram showing an example of the ticket information 50 used in the application shown in FIG. 10. Referring to FIG. 13, the ticket information 50 includes a resource allocation period 51, a resource IP address 52, a resource zone ID 53, and a service providing destination IP address 54.

The resource allocation period 51 indicates the time when the room is available. The resource IP address 52 indicates the IP address of the device 10KEY, which is a locking device associated with the reserved room. The resource zone ID 53 indicates a zone ID of the device 10KEY, which is a locking device associated with the reserved room. The service providing destination IP address 54 indicates the device 10TRM that has reserved the room.

Such ticket information 50 is shared between the device 10TRM and the target device 10KEY. As described above, the devices 10KEY1, 10KEY2, 10KEY3, ..., which are locking devices, are configured to manage the resources associated with each device. Then, in response to the request from the device 10TRM, at least some of the resources managed by the devices 10KEY1, 10KEY2, 10KEY3, ... are allocated. In addition, the information relevant to the allocation of the resource is shared between the device 10KEY that provides the resource and the device 10TRM that makes a request for the resource.

Figure 14:
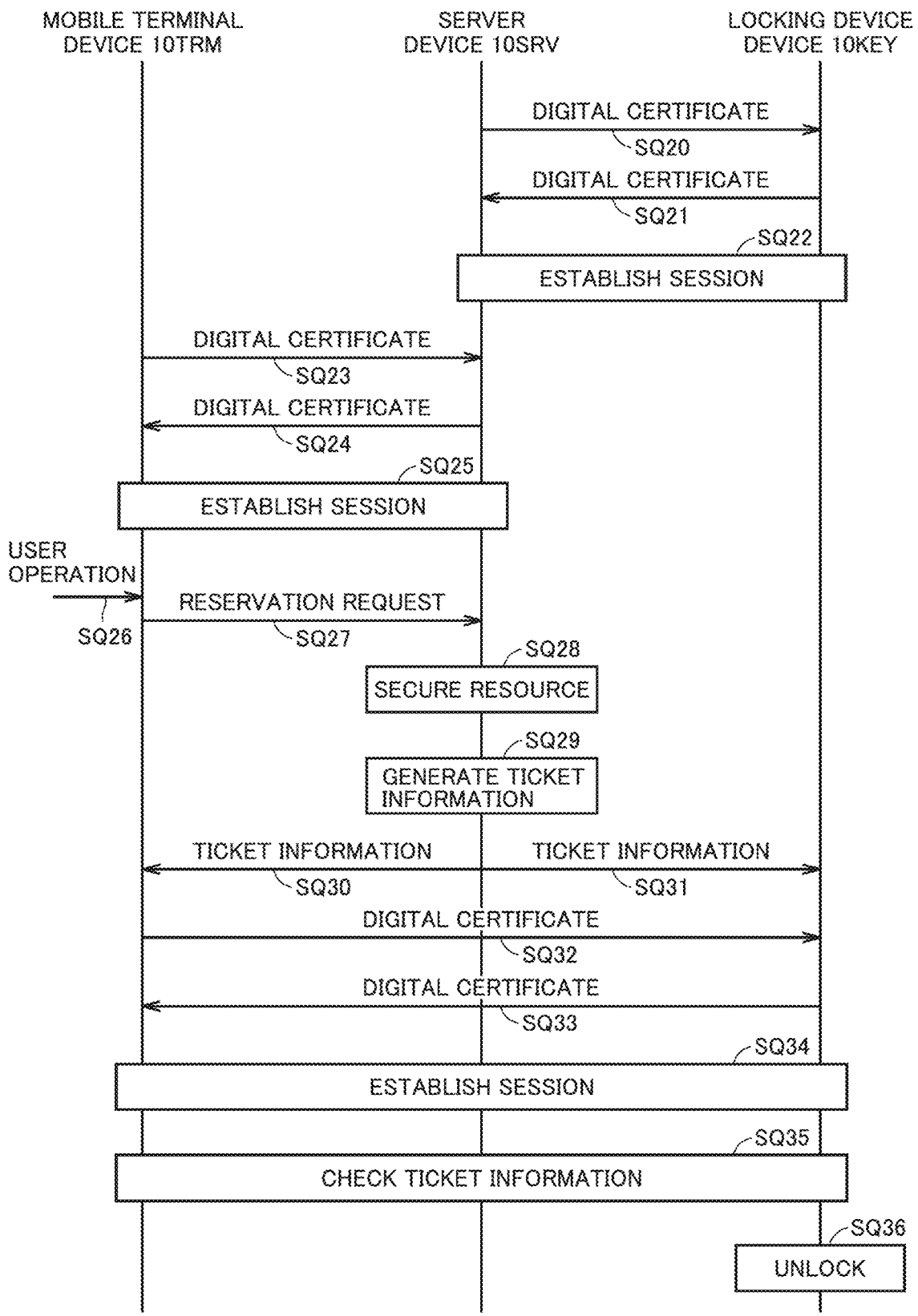
FIG. 14 is a sequence diagram showing a processing procedure for realizing the application shown in FIG. 10.

FIG. 14 is a sequence diagram showing a processing procedure for realizing the application shown in FIG. 10. Referring to FIG. 14, a process of establishing a session is first executed between devices. The device 10SRV, which is a server, transmits the digital certificate 170 of the device itself to the device 10KEY, which is a locking device (sequence SQ20), and the device 10KEY also transmits the digital certificate 170 of the device itself to the device 10SRV (sequence SQ21). The device 10SRV and the device 10KEY establish a session by exchanging the digital certificates 170 therebetween (sequence SQ22). For convenience of explanation, FIG. 14 shows only the process of establishing a session between the device 10SRV and one device 10KEY. However, a session is established in the same manner between the device 10SRV and each of the one or more devices 10KEY1, 10KEY2, 10KEY3, ....

In addition, the device 10TRM, which is a mobile terminal, transmits the digital certificate 170 of the device itself to the device 10SRV (sequence SQ23), and the device 10SRV also transmits the digital certificate 170 of the device itself to the device 10KEY (sequence SQ24). The device 10DT5 and the device 10HST establish a session by exchanging the digital certificates 170 therebetween (sequence SQ25).

Thereafter, in response to a user operation on the device 10TRM (sequence SQ26), the device 10TRM transmits a reservation request to the device 10SRV (sequence SQ27). The device 10SRV receives a reservation request from the device 10TRM and secures a resource capable of providing the requested service (sequence SQ28). Then, the device 10TRM generates the ticket information 50 according to the secured resource (sequence SQ29). The device 10SRV transmits the generated ticket information 50 to the device 10TRM that has transmitted the reservation request and the device 10KEY that provides the secured resource (sequences SQ30 and SQ31).

When the user approaches the reserved room, the device 10TRM transmits the digital certificate 170 of the device itself to the device 10KEY (sequence SQ32), and the device 10KEY also transmits the digital certificate 170 of the device itself to the device 10TRM (sequence SQ33). The device 10TRM and the device 10KEY establish a session by exchanging the digital certificates 170 therebetween (sequence SQ34). Then, a process of checking the ticket information 50 with respect to each other is executed between the device 10TRM and the device 10KEY (sequence SQ35). When the process of checking the ticket information 50 is successfully completed, the device 10KEY unlocks the managed room (sequence SQ36).

Through the above processing procedure, it is possible to provide a mechanism for a user to reserve a hotel room and use the mobile terminal itself as a room key.

In the description of the above application, a configuration in which a mobile terminal is used as a key for each room of an accommodation facility, such as a hotel, is illustrated as a typical example, but any use card can be used without being limited to thereto. For example, the mobile terminal itself can be used as an admission ticket for various facilities, such as amusement facilities, or various events, such as concerts. In addition, the mobile terminal itself can be used as a rail or air ticket.

In addition, authentication terminals (for example, gates or ticketing machines) themselves as devices, such as keys or tickets for each room of the accommodation facility, can be budgeted. The budget may be held in cooperation with deposits, payment companies, and the like. Alternatively, the mobile device itself can be budgeted. In this manner, since seamless exchange of money between the authentication terminal and the mobile terminal is possible, it is possible to build a system without the intervention of a person such as an administrator.

G. Third Application Example

As a third application example, a configuration for managing traffic resources will be described.

In this specification, the "traffic resource" means a physical or human resource used by moving bodies, such as automobiles, railroads, aircraft, and ships. Basically, the "traffic resource" is finite, and is appropriately arbitrated and used upon request. In the following, a system configured to include the device 10 that manages such traffic resources is assumed.

Figure 15:
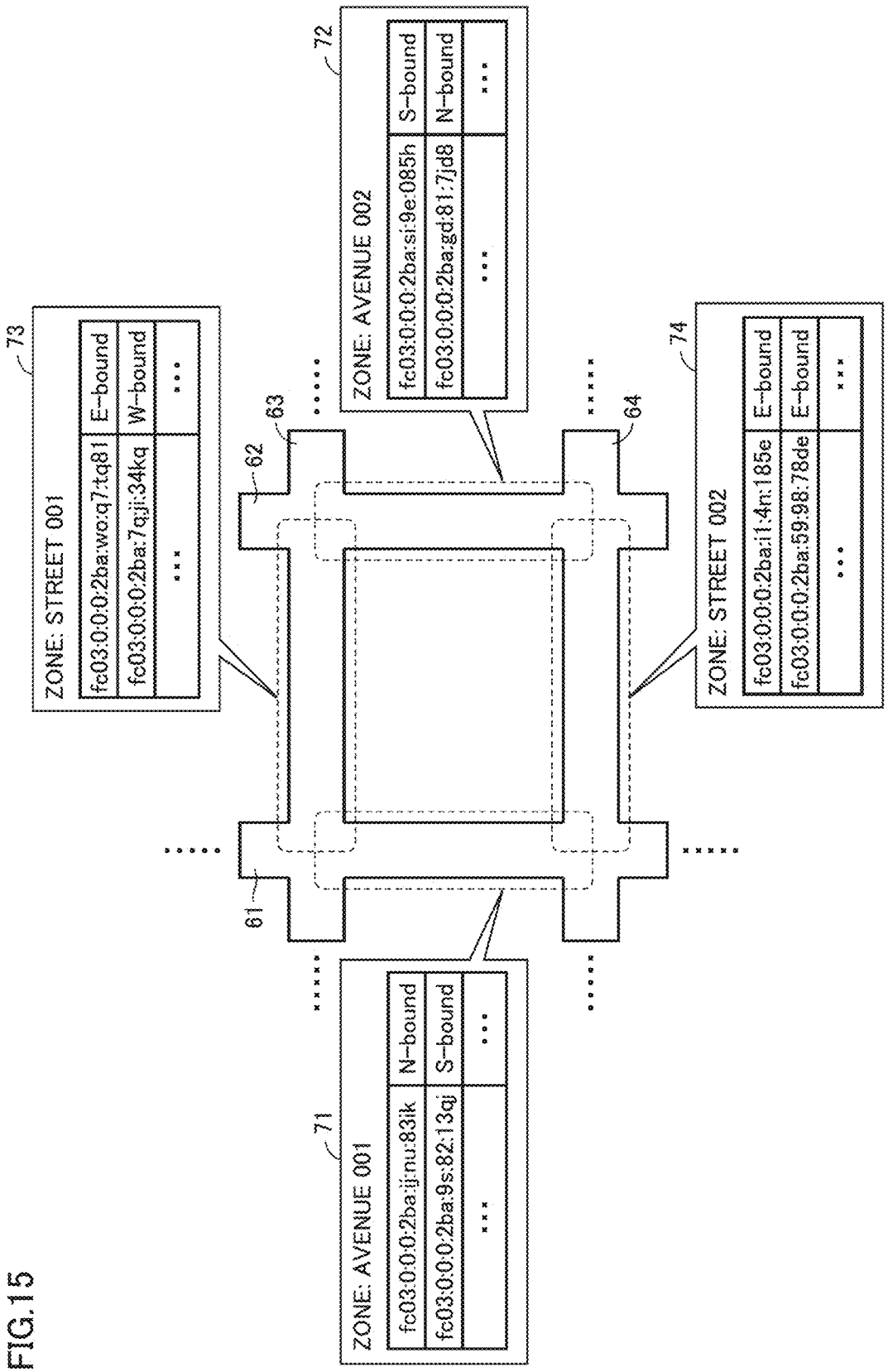
FIG. 15 is a schematic diagram showing still another example of the application using location information provided by the network system according to the present embodiment.

FIG. 15 is a schematic diagram showing still another example of the application using location information provided by the network system 1 according to the present embodiment. FIG. 15 shows a system when a road on which vehicles pass is assumed as a traffic resource. More specifically, four roads are assumed, traffic resources are defined for each section where roads 61, 62, 63, and 64 intersect each other, and the device 10 for managing each traffic resource is disposed. It is assumed that a zone ID indicating a traffic resource to be managed is set in each device 10.

The device 10 (zone: avenue 001) associated with the road 61 has a resource table 71 for managing traffic resources. Similarly, the device 10 (zone: avenue 002) associated with road 62 has a resource table 72 for managing traffic resources. Similarly, the device 10 (zone: street 001) associated with road 63 has a resource table 73 for managing traffic resources. Similarly, the device 10 (zone: street 002) associated with the road 64 has a resource table 74 for managing traffic resources.

Vehicles present in the associated traffic resources are registered in the resource tables 71 to 74. Each vehicle has an IP address, can perform data communication with the device 10 associated with each traffic resource. When the vehicle uses (or plans to use) the associated traffic resource, each device 10 that manages the resource tables 71 to 74 registers the IP address of the vehicle or the like in the corresponding resource table. In addition, when the vehicle finishes using the associated traffic resource, each device 10 that manages the resource tables 71 to 74 deletes the IP address of the vehicle from the corresponding resource table. In addition, additional information, such as the traveling direction of each vehicle, may be registered together with the above.

By managing such traffic resources, it is possible to avoid traffic congestion due to traffic concentration and the like, and it is possible to provide the optimal route selection for each vehicle.

Figure 16:
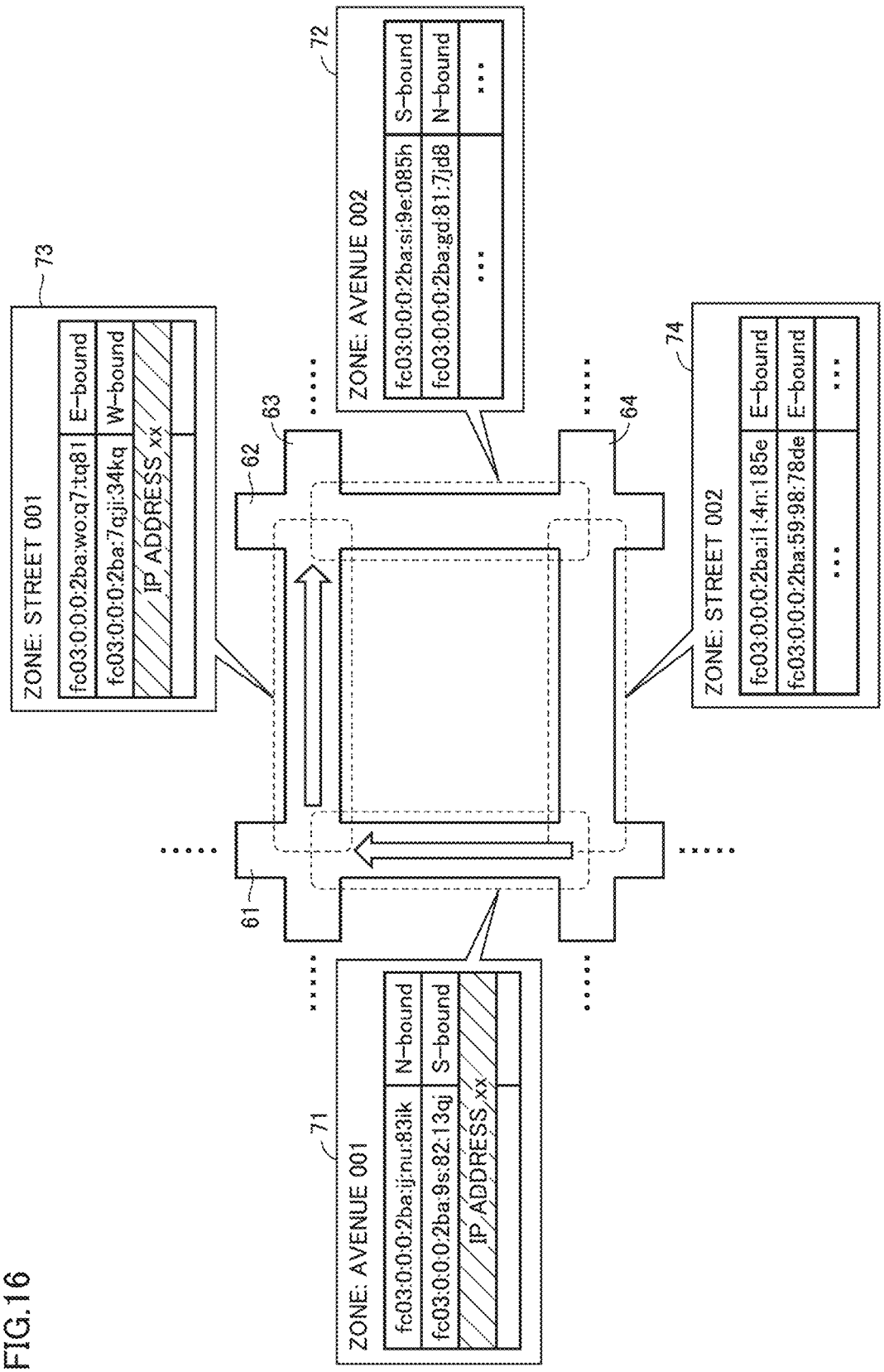
FIG. 16 is a schematic diagram showing route selection using the application shown in FIG. 15.

FIG. 16 is a schematic diagram showing route selection using the application shown in FIG. 15. Referring to FIG. 16, for example, a vehicle (IP address xx) can be made to pass smoothly by allocating the traffic resources of the road 61 and the road 63 to the vehicle in advance.

More specifically, it is possible to secure a kind of "right" for a vehicle to pass by registering the IP address of a vehicle scheduled to use the traffic resource in the resource table 71 associated with the road 61 and the resource table 73 associated with the road 63.

In this manner, by preparing the zone ID associated with each traffic resource and managing the traffic resource, to which the device 10 to which each zone ID is assigned corresponds, and managing the service that uses each traffic resource, it is possible to realize the optimal use of traffic resources.

The vehicle, which is a moving body, can identify the device 10 that manages the available traffic resource by using the code system of the zone ID.

FIG. 17 is a sequence diagram showing a processing procedure for realizing the application shown in FIG. 15. FIG. 17 shows an example of a network system including not only a device 10M mounted in a vehicle and devices 10RM1, 10RM2, 10RM3, and 10RM4, which are resource managers for managing the roads 61, 62, 63, and 64, but also the device 10SRV, which is a zone management server present in the hierarchy higher than the devices 10RM1, 10RM2, 10RM3, and 10RM4.

Referring to FIG. 17, the device 10M mounted in the vehicle acquires the current location by using an arbitrary method (sequence SQ40). Typically, the current location is acquired based on information from a GPS or a mobile base station.

Then, the device 10M transmits the digital certificate 170 of the device itself to the device 10SRV that is a zone management server (sequence SQ41), and the device 10SRV also transmits the digital certificate 170 of the device itself to the device 10M (sequence SQ42). The device 10M and the device 10SRV establish a session by exchanging the digital certificates 170 therebetween (sequence SQ43).

After the session is established, the device 10M transmits a connection destination node inquiry including the current location acquired in sequence SQ40 to the device 10SRV (sequence SQ44). The device 10SRV responds to the device 10M with the connection destination node based on the current location included in the connection destination node inquiry (sequence SQ45). The connection destination node is information for identifying the device 10 that manages the traffic resource to be used by the device 10M. In addition, as the connection destination node, a plurality of devices 10 may be included. In this example, it is assumed that the device 10RM1, which is a resource manager, is notified as a connection destination node.

Thus, in response to a request for current location from the device 10M, the device 10SRV responds with the connection destination node (identification information) for identifying the devices 10RM1, 10RM2, 10RM3, and 10RM4 associated with the current location.

Subsequently, the device 10M transmits the digital certificate 170 of the device itself to the device 10RM1 that is a resource manager (sequence SQ46), and the device 10RM1 also transmits the digital certificate 170 of the device itself to the device 10M (sequence SQ47). The device 10M and the device 10RM1 establish a session by exchanging the digital certificates 170 therebetween (sequence SQ48).

After the session is established, the device 10M transmits a resource request to the device 10RM1 (sequence SQ49). In response to the resource request from the device 10M, the device 10RM1 secures a resource according to the request (sequence SQ50). Then, the device 10RM1 transmits a resource request response indicating that the resource has been secured to the device 10M (sequence SQ51). In addition, the device 10RM1 identifies a traffic resource following the traffic resource managed by the device 10RM1, and responds to the device 10M with a connection destination node indicating a resource manager that manages the identified traffic resource (sequence SQ52). In this example, it is assumed that the device 10RM2, which is a resource manager, is notified as a connection destination node.

Subsequently, the device 10M transmits the digital certificate 170 of the device itself to the device 10RM2 that is a resource manager (sequence SQ53), and the device 10RM2 also transmits the digital certificate 170 of the device itself to the device 10M (sequence SQ54). The device 10M and the device 10RM2 establish a session by exchanging the digital certificates 170 therebetween (sequence SQ55).

After the session is established, the device 10M transmits a resource request to the device 10RM2 (sequence SQ56). In response to the resource request from the device 10M, the device 10RM2 secures a resource according to the request (sequence SQ57). Then, the device 10RM2 transmits a resource request response indicating that the resource has been secured to the device 10M (sequence SQ58). In addition, the device 10RM2 identifies a traffic resource following the traffic resource managed by the device 10RM2, and responds to the device 10M with a connection destination node indicating a resource manager that manages the identified traffic resource (sequence SQ59). Hereinafter, the same processes as sequences SQ46 to SQ52 and sequences SQ53 to SQ59 are repeated.

By such a processing procedure, the allocation of traffic resources shown in FIG. 16 is completed. As a result, efficient use of traffic resources can be realized.

As described above, the devices 10RM1, 10RM2, 10RM3, and 10RM4 are configured to manage the traffic resources associated with each device. Then, in response to the request from the device 10M, at least some of the traffic resources managed by the devices 10RM1, 10RM2, 10RM3, and 10RM4 are allocated.

In the above description of the application, the case where the road is adopted as a typical example of the traffic resource has been illustrated. However, the invention is not limited thereto, and applications to any traffic resource are possible. For example, each seat in each of a railroad, an aircraft, and a ship can be treated as a traffic resource.

Budgets can also be allocated for the traffic resources described above. In this case, if it is desired to guarantee that the destination is reached in the shortest time, it is possible to propose a mechanism in which the road user pays for the traffic resource. On the other hand, for a road that is not congested even though the road is an efficient route, it is also possible to pay the user or the like for the use from the budget for the traffic resource.

H. Other Forms

In the above-described application examples, the process of exchanging data between the devices 10 has been illustrated. However, the invention is not limited thereto, and commands may be exchanged between the devices 10. By exchanging such commands, it is possible to dynamically change the role of the device 10 and the like.

By dynamically changing such a role, for example, it is possible to delegate the processing of one device 10 to another device 10. For example, when a problem occurs in the device 10 in charge of managing traffic resources as shown in FIG. 15 or when the amount of processing relevant to the management of traffic resources increases, the role may be changed such that the device 10 in charge of the processing is changed to another device 10 or another device 10 is added in addition to the device 10 in charge of the processing. Any method for optimally using the device 10 as the entire network system can be adopted.

I. Advantages

According to the network system 1 according to the present embodiment, it is possible to acquire the authenticated location information of the device and to provide various services using the authenticated location information.

It should be considered that the embodiment disclosed is an example in all points and not restrictive. The scope of the invention is defined by the claims rather than the above description, and is intended to include all modifications within the scope and meaning equivalent to the claims.

EXPLANATIONS OF LETTERS OR NUMERALS

1 NETWORK SYSTEM
2 CERTIFICATE AUTHORITY
10, 10A1 to 10A4, 10B1 to 10B5, 10C1 to 10C4, 10DT1 to 10DT6, 10HST, 10KEY, 10KEY1 to 10KEY3, 10M, 10MST, 10RM1 to 10RM4, 10SRV, 10TRM DEVICE
40 ACCOMMODATION FACILITY
50 TICKET INFORMATION
51 RESOURCE ALLOCATION PERIOD
52, 54, 168 IP ADDRESS
53, 182 ZONE ID
61, 62, 63, 64 ROAD
71, 72, 73, 74 RESOURCE TABLE
102 PROCESSOR
104 MAIN MEMORY
106 STORAGE
108 ROM
110 CONTROL UNIT
120 NETWORK INTERFACE
130 INTERNAL INTERFACE
140 INPUT UNIT
150 OUTPUT UNIT
160 PRIVATE KEY
162 PUBLIC KEY
164 HASH FUNCTION
166 HASH VALUE
170 DIGITAL CERTIFICATE
171 VERSION INFORMATION
172 SERIAL NUMBER
173 SIGNATURE ALGORITHM
174 ISSUER IDENTIFICATION NAME
175 EXPIRATION DATE
176 SUBJECT IDENTIFICATION NAME
178 CERTIFICATE AUTHORITY SIGNATURE
180 EXTENDED INFORMATION

The invention claimed is:

1. A network system comprising:
a plurality of devices, wherein:
each of the devices has an authenticated network address cryptographically determined in advance, and
when a first device of the plurality of devices obtains a digital certificate including location information, the first device identifies a location or an area where a device having an authenticated network address associated with the obtained digital certificate is located, based on the location information in the obtained digital certificate.

2. The network system according to claim 1, wherein the location information indicates a zone generated by hierarchical division of a zone.

3. The network system according to claim 1, wherein the location information comprises a code on which a hierarchical structure of a target zone is reflected.

4. The network system according to claim 1, wherein
a second device of the plurality of devices issues a request for the location information to be set for the second device to another device associated with a zone in a hierarchy higher than a zone indicated by the location information associated with the authenticated network address of the second device.

5. The network system according to claim 1, wherein the authenticated network address of each device is uniquely determined based on a result of input into a hash function, of a public key included in a key pair allocated to each of the devices.

6. The network system according to claim 1, wherein each of the devices determines a network address of another device based on a public key obtained from the another device.

7. The network system according to claim 1, wherein the first device is configured to:
  manage a resource associated with the first device,
  allocate at least some of the resource that the first device manages, in response to
  a request from another device, and
  information on allocation of the resource is shared between the first device and the another device.

8. The network system according to claim 1, wherein in response to a request for a location from another device, the first device gives identification information for identification of a device associated with the requested location.

9. The network system according to claim 1, wherein the first device manages a value which is a price for goods or services.

10. A device included in a network system, wherein:
  the device has an authenticated network address of the device, the authenticated network address being cryptographically determined in advance, and
  when the device obtains a digital certificate including location information, the device identifies a location or an area where a device having an authenticated network address associated with the obtained digital certificate is located, based on the location information included in the obtained digital certificate.

11. The device according to claim 10, wherein the location information indicates a zone generated by hierarchical division of a zone.

12. The device according to claim 10, wherein the location information comprises a code on which a hierarchical structure of a target zone is reflected.

13. The device according to claim 10, wherein the authenticated network address of the device is uniquely determined based on a result of input into a hash function, of a public key included in a key pair allocated to the device.

14. The device according to claim 10, wherein the device determines a network address of another device based on a public key obtained from the another device.

15. A processing method in a network system comprising a plurality of devices, comprising:
  preparing, at each of the devices, an authenticated network address cryptographically determined in advance;
  obtaining, at a first device of the plurality of devices, a digital certificate including location information; and
  identifying, at the first device, a location or an area where a device having an authenticated network address associated with the obtained digital certificate is located, based on the location information included in the obtained digital certificate.

16. The processing method according to claim 15, wherein the location information indicates a zone generated by hierarchical division of a zone.

17. The processing method according to claim 15, wherein the location information comprises a code on which a hierarchical structure of a target zone is reflected.

18. The processing method according to claim 15, wherein the authenticated network address of each device is uniquely determined based on a result of input into a hash function, of a public key included in a key pair allocated to each of the devices.

19. The processing method according to claim 15, further comprising determining, at each of the devices, a network address of another device based on a public key obtained from the another device.

* * * * *